US009240266B2

(12) United States Patent
Takenaka et al.

(10) Patent No.: US 9,240,266 B2
(45) Date of Patent: Jan. 19, 2016

(54) GRAIN ORIENTED ELECTRICAL STEEL SHEET

(75) Inventors: Masanori Takenaka, Tokyo (JP); Minoru Takashima, Tokyo (JP); Hiroi Yamaguchi, Tokyo (JP); Takeshi Omura, Tokyo (JP)

(73) Assignee: JFE Steel Corporation (JP)

( * ) Notice: Subject to any disclaimer, the term of this patent is extended or adjusted under 35 U.S.C. 154(b) by 238 days.

(21) Appl. No.: 13/814,344

(22) PCT Filed: Aug. 4, 2011

(86) PCT No.: PCT/JP2011/004443

§ 371 (c)(1), (2), (4) Date: Feb. 5, 2013

(87) PCT Pub. No.: WO2012/017671

PCT Pub. Date: Feb. 9, 2012

(65) Prior Publication Data

US 2013/0143003 A1 Jun. 6, 2013

(30) Foreign Application Priority Data

Aug. 6, 2010 (JP) ................................ 2010-178087

(51) Int. Cl.

| | |
|---|---|
| ***B32B 15/00*** | (2006.01) |
| ***H01F 1/18*** | (2006.01) |
| ***C21D 1/38*** | (2006.01) |

(Continued)

(52) U.S. Cl.

CPC .. *H01F 1/18* (2013.01); *C21D 1/38* (2013.01); *C21D 8/12* (2013.01); *C21D 8/1277* (2013.01); *C21D 8/1283* (2013.01); *C22C 38/00* (2013.01); *C21D 2201/05* (2013.01); *Y10T 428/24628* (2015.01)

(58) Field of Classification Search

None

See application file for complete search history.

(56) References Cited

U.S. PATENT DOCUMENTS 5,296,051 A * 3/1994 Inokuti et al. ................ 148/113

FOREIGN PATENT DOCUMENTS

| | | |
|---|---|---|
| CN | 1076492 | 9/1993 |
| JP | 55-18566 | 2/1980 |

(Continued)

OTHER PUBLICATIONS

English Machine Translation: Hiratani (JP 2006-257534).*

(Continued)

*Primary Examiner* — Mark Ruthkosky

*Assistant Examiner* — Linda Chau

(74) *Attorney, Agent, or Firm* — DLA Piper LLP (US)

(57) ABSTRACT

A grain oriented electrical steel sheet has sufficiently low iron loss and having less conventionally-concerned warpage of the steel sheet even after the steel sheet is subjected to artificial magnetic domain refining treatment, where strain-introducing treatment is conducted with high energy so that an iron loss-reducing effect can be maximized. The grain oriented electrical steel sheet is obtained by adjusting tension to be applied to a tension-applying insulating coating, or to both surfaces of the steel sheet by the tension-applying insulating coating, before strain-introducing treatment in the range of Formula (1):

$$1.0 \leq \text{(tension applied to non-strain-introduced surface)}/\text{(tension applied to strain-introduced surface)} \leq 2.0 \quad (1),$$

and by controlling the amount of warpage of the steel sheet toward the strain-introduced surface side after strain-introducing treatment in the range of 1 mm or more and 10 mm or less.

12 Claims, 2 Drawing Sheets

(51) Int. Cl.
*C21D 8/12* (2006.01)
*C22C 38/00* (2006.01)

(56) References Cited

FOREIGN PATENT DOCUMENTS

| | | | |
|---|---|---|---|
| JP | 57-002252 | B2 | 1/1982 |
| JP | 57-192223 | | 11/1982 |
| JP | 57-192223 | A | 11/1982 |
| JP | 4-083825 | A | 3/1992 |
| JP | 4-362139 | A | 12/1992 |
| JP | 5-179355 | | 7/1993 |
| JP | 6-2042 | | 1/1994 |
| JP | 6-072266 | B2 | 9/1994 |
| JP | 2006-257534 | A | 9/2006 |
| JP | 2008-63655 | | 3/2008 |
| JP | 2009-235472 | A | 10/2009 |
| JP | 2009-235473 | A | 10/2009 |
| WO | 2009/104521 | | 8/2009 |

OTHER PUBLICATIONS

Chinese Office Action dated Jun. 4, 2014 along with an English translation from corresponding Chinese Application No. 201180038936.8.

Jingdong Li et al., "Decreasing the core loss of grain-oriented silicon steel by laser processing," Journal of Materials Processing Technology, vol. 69, No. 1-3, 1997, pp. 180-185.

Korean Notice of Reasons for Rejection dated Oct. 24, 2014 along with an English translation from corresponding Korean Patent Application No. 2013-7002767.

Japanese Office Action of corresponding Japanese Application No. 2011-171764 dated Feb. 24, 2015 with English translation.

* cited by examiner

GRAIN ORIENTED ELECTRICAL STEEL SHEET

RELATED APPLICATIONS

This is a §371 of International Application No. PCT/JP2011/004443, with an international filing date of Aug. 4, 2011 (WO 2012/017671 A1, published Feb. 9, 2012), which is based on Japanese Patent Application No. 2010-178087, filed Aug. 6, 2010, the subject matter of which is incorporated herein by reference.

TECHNICAL FIELD

This disclosure relates to a so-called grain oriented electrical steel sheet in which crystal grains are accumulated in {110} plane parallel to the sheet plane and in <001> orientation parallel to the rolling direction in Miller index.

BACKGROUND

Grain oriented electrical steel sheets mainly used as iron cores of electric appliances such as transformers are required to have excellent magnetic properties, in particular, low iron loss properties. There have been mainly employed in this regard, as indices of magnetic properties, magnetic flux density $B_8$ at magnetic field strength: 800 A/m and iron loss (per kg) $W_{17/50}$ when a grain oriented electrical steel sheet has been magnetized to 1.7 T in an alternating magnetic field of excitation frequency: 50 Hz.

To reduce iron loss of a grain oriented electrical steel sheet, it is important to subject the steel sheet to secondary recrystallization annealing so that secondary recrystallized grains are accumulated in {110}<001> orientation (or Goss orientation) and to reduce impurities in the product.

However, there are limitations in controlling crystal orientation and reducing impurities in terms of balancing manufacturing cost, and so on. Therefore, some techniques have been developed to introduce non-uniformity to the surfaces of a steel sheet in a physical manner and artificially reducing the magnetic domain width to reduce iron loss, namely, magnetic domain refining techniques.

For example, JP 57-002252 B proposes a technique for reducing iron loss by irradiating a final product steel sheet with a laser, introducing a linear, high dislocation density region to the surface layer of the steel sheet and thereby reducing the magnetic domain width.

In addition, JP 06-072266 B proposes a technique for controlling the magnetic domain width by means of electron beam irradiation.

To perform magnetic domain refining treatment such that it is effective in reducing iron loss, it is necessary to introduce relatively large thermal energy to a surface of a steel sheet. However, a problem arose when such large thermal energy was introduced to a surface of the steel sheet, where the steel sheet suffered warping toward the surface on which the strain-introducing treatment had been performed.

Once warping occurs, the steel sheet may possibly experience a degradation in handling ability when assembled as transformers or the like, deterioration in hysteresis loss due to its shape, deterioration in hysteresis loss caused by the elasticity strain introduced when the steel sheet is assembled as transformers or the like, and so on. This is considered significantly disadvantageous in terms of both manufacture and properties.

It could therefore be helpful to provide a grain oriented electrical steel sheet having sufficiently low iron loss and having less conventionally-concerned warpage of the steel sheet effectively even after the steel sheet is subjected to artificial magnetic domain refining treatment, where strain-introducing treatment is conducted with high energy so that an iron loss-reducing effect can be maximized.

SUMMARY

We thus provide:

[1] A grain oriented electrical steel sheet having a tension-applying insulating coating on both surfaces of the steel sheet and having a magnetic domain structure modified by strain being introduced to one of the surfaces of the steel sheet, wherein tension applied to the both surfaces of the steel sheet by the tension-applying insulating coating before strain-introducing treatment satisfies a relation of Formula (1) below, and the amount of warpage of the steel sheet toward a strain-introduced surface side after strain-introducing treatment is 1 mm or more and 10 mm or less:

$$1.0 \leq \text{(tension applied to non-strain-introduced surface)/(tension applied to strain-introduced surface)} \leq 2.0 \quad (1),$$

where the amount of warpage of the steel sheet indicates the amount of displacement at a free end of a sample having a length of 280 mm in a rolling direction when placed so that a transverse direction perpendicular to the rolling direction is vertical, clamped and fixed at another end opposite to the free end over a length of 30 mm in the rolling direction.

[2] The grain oriented electrical steel sheet according to item [1] above, wherein the tension applied to the both surfaces of the steel sheet by the tension-applying insulating coating before strain-introducing treatment satisfies a relation of Formula (2) below and the amount of warpage of the steel sheet toward a strain-introduced surface side after strain-introducing treatment is 3 mm or more and 8 mm or less:

$$1.2 \leq \text{(tension applied to non-strain-introduced surface)/(tension applied to strain-introduced surface)} \leq 1.6 \quad (2),$$

where the amount of warpage of the steel sheet indicates the amount of displacement at a free end of a sample having a length of 280 mm in a rolling direction when placed so that a transverse direction perpendicular to the rolling direction is vertical, clamped and fixed at another end opposite to the free end over a length of 30 mm in the rolling direction.

[3] A grain oriented electrical steel sheet having a tension-applying base film on both surfaces of the steel sheet and having a magnetic domain structure modified by strain being introduced to one of the surfaces of the steel sheet, wherein tension applied to the both surfaces of the steel sheet by the tension-applying base film before strain-introducing treatment satisfies a relation of Formula (3) below, and the amount of warpage of the steel sheet toward a strain-introduced surface side after strain-introducing treatment is 1 mm or more and 10 mm or less:

$$1.0 \leq \text{(tension applied to non-strain-introduced surface)/(tension applied to strain-introduced surface)} \leq 2.0 \quad (3),$$

where the amount of warpage of the steel sheet indicates the amount of displacement at a free end of a sample having a length of 280 mm in a rolling direction when placed so that a transverse direction perpendicular to the rolling direction is vertical, clamped and fixed at another end opposite to the free end over a length of 30 mm in the rolling direction.

[4] The grain oriented electrical steel sheet according to item [3] above, wherein tension applied to the both surfaces of the steel sheet by the tension-applying base film before strain-introducing treatment satisfies a relation of Formula (4) below and the amount of warpage of the steel sheet toward a strain-introduced surface side after strain-introducing treatment is 3 mm or more and 8 mm or less:

$$1.2 \leq (\text{tension applied to non-strain-introduced surface})/(\text{tension applied to strain-introduced surface}) \leq 1.6 \quad (4),$$

where the amount of warpage of the steel sheet indicates the amount of displacement at a free end of a sample having a length of 280 mm in a rolling direction when placed so that a transverse direction perpendicular to the rolling direction is vertical, clamped and fixed at another end opposite to the free end over a length of 30 mm in the rolling direction.

[5] The grain oriented electrical steel sheet according to any one of items [1] to [4], wherein the strain-introducing treatment is electron beam irradiation.

[6] The grain oriented electrical steel sheet according to any one of items [1] to [4], wherein the strain-introducing treatment is continuous laser irradiation.

It is possible to obtain a grain oriented electrical steel sheet that has low iron loss by delivering a maximum iron loss-reducing effect and has less conventionally-concerned warpage of the steel sheet after the steel sheet is subjected to artificial magnetic domain refining treatment, where strain-introducing treatment is conducted so that an iron loss-reducing effect can be maximized.

BRIEF DESCRIPTION OF THE DRAWINGS

Our steel sheets will be further described below with reference to the accompanying drawings, wherein.

DETAILED DESCRIPTION

Figure 1:
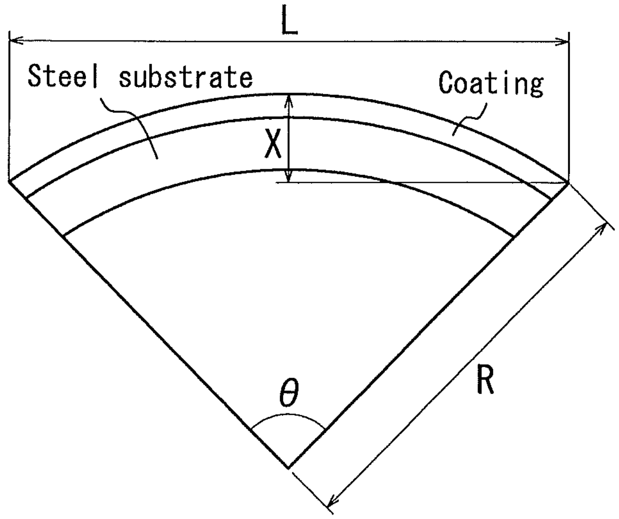
FIG. 1 illustrates how tensile stress σ of a surface of the steel substrate is calculated.

Our grain oriented electrical steel sheets are subjected to artificial magnetic domain refining treatment, where strain-introducing treatment is conducted so that an iron loss-reducing effect can be maximized, conventionally-concerned warpage of the steel sheet toward the side of a stain-introduced surface is suppressed by making a difference in the tension to be applied to both surfaces of the steel sheet, and the strain-introduced surface and the opposite surface (the latter surface will be referred to as "non-strain-introduced surface") by a tension-applying base film or a tension-applying insulating coating, specifically, by applying larger tension to the non-strain-introduced surface.

A process for introducing strain to one side of the steel sheet to modify its magnetic domain structure is referred to as "magnetic domain refining treatment." In this case, no problem arises if any strain introduced to one surface of the steel sheet affects the magnetic domain structure at the opposite surface of the steel sheet.

Usually, in the base film, forsterite ($Mg_2SiO_4$) is formed during final annealing through a reaction of so-called "subscales" composed of fayalite ($Fe_2SiO_4$) and silica ($SiO_2$) and formed on the surfaces of the steel sheet prior to the final annealing, with magnesia (MgO), which is applied as an annealing separator. As a result, tensile stress is applied to the steel sheet side due to a difference in thermal expansion coefficient between the steel sheet and the base film. In addition, application of the insulating coating is usually performed just before flattening annealing following the final annealing. Then, tensile stress is applied to the steel sheet side due to a difference in thermal expansion coefficient between the steel sheet and the insulating coating during the flattening annealing.

It is also known that the tensile stress applied to the steel sheet increases in proportion to the thickness of the insulating coating. In other words, tensile stress applied to each surface of the steel sheet can be changed by changing the thickness of the insulating coating on each surface of the steel sheet.

In the following, our steel sheets will be described with experimental data.

Cold-rolled sheets containing 3.2 mass % of Si, each of which had been rolled to a final sheet thickness of 0.23 mm, were subjected to decarburization/primary recrystallization annealing. Then, an annealing separator composed mainly of MgO was applied to each sheet. Subsequently, each sheet was subjected to final annealing including a secondary recrystallization process and a purification process, whereby a grain oriented electrical steel sheet having a forsterite film was obtained. Then, a coating solution composed of 60% colloidal silica and aluminum phosphate was applied to each sheet. The resulting sheet was baked at 800° C. to form a tension-applying insulating coating. In this case, the coating amount of the insulating coating on only one surface of the steel sheet was changed so that different tensions were applied to both surfaces of the steel sheet by the insulating coating.

Thereafter, magnetic domain refining treatment was performed on one surface of the steel sheet, where the surface was irradiated with electron beam in a direction perpendicular to the rolling direction.

Electron beam was irradiated under fixed conditions of acceleration voltage: 100 kV and irradiation interval: 10 mm, while switching between three beam current conditions: 1 mA, 3 mA and 10 mA.

Tension applied to each steel sheet by the insulating coating was measured as follows.

First, each steel sheet was immersed in an alkaline aqueous solution with tape applied to the measurement surface so as to exfoliate the insulating coating on the non-measurement surface. Then, as illustrated in FIG. 1, L and X are measured as warpage condition of the steel sheet, and radius of curvature R is derived from the following two equations:

$$L = 2R\sin(\theta/2)$$

$$X = R\{1-\cos(\theta/2)\},$$

i.e., $$R = (L^2+4X^2)/8X.$$

Thus, radius of curvature R is calculated by substitution of L and X into this equation. Then, the calculated radius of curvature R may be substituted into the following equation to determine tensile stress σ of a surface of the steel substrate:

$$\sigma = E\cdot\epsilon = E\cdot(d/2R),$$

where E: Young's modulus ($E_{100}=1.4\times10^5$ MPa)

ϵ: interface strain of steel substrate (at sheet thickness center, ϵ=0)

d: sheet thickness.

In this way, the tension applied to the strain-introduced surface and non-strain-introduced surface by the insulating coating was calculated.

Figure 2:
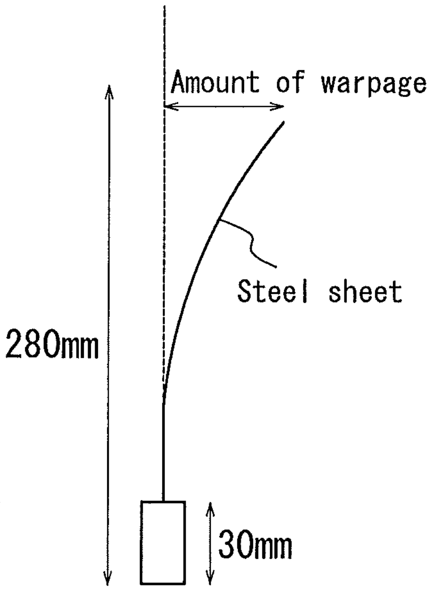
FIG. 2 illustrates how the amount of warpage of the steel sheet is measured.

In addition, as illustrated in FIG. 2, the amount of warpage of each steel sheet was evaluated simply as the amount of displacement at a free end of a sample having a length of 280 mm in a rolling direction when placed so that a transverse direction perpendicular to the rolling direction is vertical, clamped and fixed at another end opposite to the free end over a length of 30 mm in the rolling direction.

Figure 3:
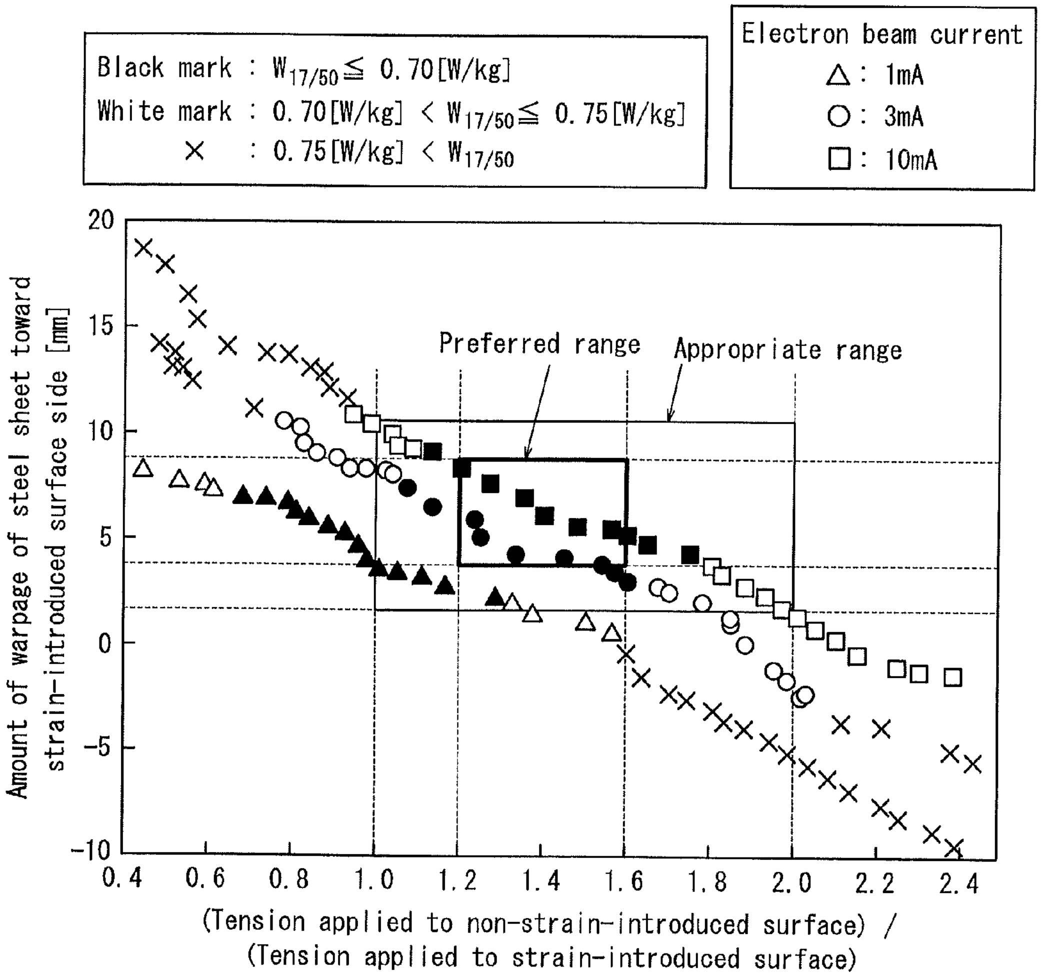
FIG. 3 illustrates how iron loss $W_{17/50}$ after strain introduction is affected by the value of (tension applied to non-strain-introduced surface)/(tension applied to strain-introduced surface) and the amount of warpage of the steel sheet toward the strain-introduced surface side.

The results of analyzing iron loss $W_{17/50}$ after electron beam irradiation are shown in FIG. 3 in relation to "(tension applied to non-strain-introduced surface)/(tension applied to strain-introduced surface)" (hereinafter, also referred to simply as "tension ratio") and the amount of warpage of the steel sheet toward the strain-introduced surface side.

It can be seen that increasing the value of (tension applied to non-strain-introduced surface)/(tension applied to strain-introduced surface), i.e., increasing the tension to be applied to the non-strain-introduced surface by the insulating coating leads to a reduction in the amount of warpage of the steel sheet toward the strain-introduced surface side. Depending on the current value of electron beam, it will also be understood that the amount of warpage of the steel sheet becomes approximately zero at a tension ratio of around 1.9, whereas the steel sheet is warped to the non-strain-introduced surface at a tension ratio above around 1.9.

As also shown in FIG. 3, if a steel sheet has a low tension ratio, it remains flat as long as the degree of magnetic domain refinement (irradiation intensity of electron beam, laser and so on) is small. Conversely, even if a steel sheet has a high tension ratio, it can still remain flat by enhancing the degree of magnetic domain refinement.

However, as a result of further investigations in consideration of an effect of improving the iron loss value, we found that an iron loss value as low as $W_{17/50}$ 0.75 W/kg (sheet thickness: 0.23 mm) may be obtained if the tension ratio is not less than 1.0 and not more than 2.0 and the amount of warpage of the steel sheet toward the strain-introduced surface side is not less than 1 mm and not more than 10 mm. More preferably, the tension ratio is not less than 1.2 and not more than 1.6 and the amount of warpage of the steel sheet toward the strain-introduced surface side is within a range of 3 mm or more and 8 mm or less, in which case the iron loss value could be reduced to $W_{17/50}\leq0.70$ W/kg (sheet thickness: 0.23 mm).

When the tension ratio is less than 1.0 or the amount of warpage of the steel sheet toward the strain-introduced surface side is more than 10 mm, a deterioration in hysteresis loss was observed due to an increase in the amount of warpage of the steel sheet. On the other hand, when the tension ratio is more than 2.0 or the amount of warpage of the steel sheet toward the strain-introduced surface side is less than 1 mm, hysteresis loss was improved, but a sudden increase in eddy current loss was observed, which caused a deterioration in iron loss.

In this experiment, the tension by the insulating coating was controlled by controlling the coating amount of the insulating coating to be applied to the strain-introduced surface and the non-strain-introduced surface after final annealing. However, the same effect may also be obtained by controlling the tension of the forsterite film after final annealing. The tension by the forsterite film may be controlled by, for example, changing the amount of the annealing separator to be applied before final annealing.

Suitable strain-introducing treatment includes electron beam irradiation, continuous laser irradiation, and so on. Irradiation is preferably performed in a direction transverse to the rolling direction, preferably at 60° to 90° in relation to the rolling direction, and at intervals of preferably about 3 to 15 mm in a linear fashion. As used herein, "linear" is intended to encompass a solid line as well as a dotted line, a dashed line, and so on.

In the case of an electron beam, it is effective to apply the electron beam in a linear fashion with an acceleration voltage of 10 to 200 kV, current of 0.005 to 10 mA and beam diameter of 0.005 to 1 mm. On the other hand, in the case of a continuous laser, the power density is preferably 100 to 10000 $W/mm^2$ depending on the scanning rate of laser beam. In addition, such a technique is also effective where the power density is kept constant and changed periodically by modulation. Effective excitation sources include fiber laser excited by semiconductor laser, and so on.

For example, since Q-switch type pulse laser leaves a trace of treatment, re-coating is necessitated if irradiation of the laser is performed after tension coating.

The grain oriented electrical steel sheet is not limited to a particular electrical steel sheet. Hence, any well-known grain oriented electrical steel sheets are applicable. For example, an electrical steel material containing Si in an amount of 2.0 to 8.0 mass % may be used.

Si: 2.0 to 8.0 Mass %

Si is an element useful to increase electrical resistance of steel and improve iron loss. Si content of 2.0 mass % or more has a particularly good effect in reducing iron loss. On the other hand, Si content of 8.0 mass % or less may offer particularly good workability and magnetic flux density. Thus, Si content is preferably 2.0 to 8.0 mass %.

The base elements other than Si and optionally added elements will be described below.

C: 0.08 Mass % or Less

C is added to improve the texture of the steel sheet. However, C content exceeding 0.08 mass % increases the burden to reduce C content to 50 mass ppm or less where magnetic aging will not occur during the manufacturing process. Thus, C content is preferably 0.08 mass % or less. Besides, it is not necessary to set up a particular lower limit to C content because secondary recrystallization is enabled by a material without containing C.

Mn: 0.005 to 1.0 Mass %

Mn is an element necessary to improve hot workability. However, Mn content of less than 0.005 mass % has a less addition effect. On the other hand, Mn content of 1.0 mass % or less provides a particularly good magnetic flux density to the product sheet. Thus, Mn content is preferably 0.005 to 1.0 mass %.

In addition, to cause secondary recrystallization, if an inhibitor, e.g., an AlN-based inhibitor is used, Al and N may be contained in an appropriate amount, respectively, while if a MnS/MnSe-based inhibitor is used, Mn and Se and/or S may be contained in an appropriate amount, respectively. Of course, these inhibitors may also be used in combination. In this case, preferred contents of Al, N, S and Se are: Al: 0.01 to 0.065 mass %; N: 0.005 to 0.012 mass %; S: 0.005 to 0.03 mass %; and Se: 0.005 to 0.03 mass %, respectively.

Further, our grain oriented electrical steel sheets may have limited contents of Al, N, S and Se without using an inhibitor. In this case, the contents of Al, N, S and Se are preferably Al: 100 mass ppm or less, N: 50 mass ppm or less, S: 50 mass ppm or less, and Se: 50 mass ppm or less, respectively.

Further, in addition to the above elements, the steel sheet may also contain the following elements as elements to improve magnetic properties:

at least one element selected from: Ni: 0.03 to 1.50 mass %; Sn: 0.01 to 1.50 mass %; Sb: 0.005 to 1.50 mass %; Cu: 0.03 to 3.0 mass %; P: 0.03 to 0.50 mass %; Mo: 0.005 to 0.10 mass %; and Cr: 0.03 to 1.50 mass %.

Ni is an element useful to further improve the texture of a hot-rolled sheet to obtain even more improved magnetic properties. However, Ni content of less than 0.03 mass % is less effective in improving magnetic properties, whereas Ni content of 1.5 mass % or less increases, in particular, the stability of secondary recrystallization and provides even more improved magnetic properties. Thus, Ni content is preferably 0.03 to 1.5 mass %.

In addition, Sn, Sb, Cu, P, Mo and Cr are elements useful to improve the magnetic properties, respectively. However, if any of these elements is contained in an amount less than its lower limit described above, it is less effective for improving the magnetic properties, whereas if contained in an amount equal to or less than its upper limit described above, it gives the best growth of secondary recrystallized grains. Thus, each of these elements is preferably contained in an amount within the above-described range.

The balance other than the above-described elements is Fe and incidental impurities that are incorporated during the manufacturing process.

In addition, such a grain oriented electrical steel sheet that has a magnetic flux density $B_8$ of 1.90 T or more is advantageously adaptable as the grain oriented electrical steel sheet. This is because a grain oriented electrical steel sheet having a low magnetic flux density $B_8$ has a large deviation angle between the rolling direction and the <001> orientation of secondary recrystallized grains after the steel sheet is subjected to final annealing, and the <001> orientation has a large elevation angle from the steel sheet (hereinafter, referred to as "β angle"). A larger deviation angle results in less desirable hysteresis loss, while a larger β angle leads to a narrower magnetic domain width. Consequently, it is not possible to obtain a sufficient effect of reducing iron loss by magnetic domain refining treatment. More preferably, $B_8 \geq 1.92$ T.

Steel slabs having the above-described chemical compositions are finished to grain oriented electrical steel sheets in which tension-applying insulating coatings are also formed after secondary recrystallization annealing through a common process for use in grain oriented electrical steel sheets. That is, each steel slab is subjected to slab heating and subsequent hot rolling to obtain a hot-rolled sheet. Then, the hot rolled sheet is subjected to cold rolling once, or twice or more with intermediate annealing performed therebetween, to be finished to a final sheet thickness, and subsequent decarbonization/primary recrystallization annealing. Thereafter, for example, an annealing separator mainly composed of MgO is applied to each sheet, which in turn is subjected to final annealing including a second recrystallization process and a purification process. As used herein, the phrase "composed mainly of MgO" implies that any well-known compound for the annealing separator and any property improvement compound other than MgO may also be contained within a range without interfering with the formation of an intended forsterite film.

Thereafter, for example, a coating solution mainly composed of colloidal silica and one or more phosphates such as Al, Mg, Ca or Zn may be applied to each sheet, which is then baked to form a tension-applying insulating coating. As used herein, the phrase "mainly composed of colloidal silica and one or more phosphates such as Al, Mg, Ca or Zn" implies that any publicly-known insulating coating components and property improving components other than the above may also be contained within a range without interfering with the formation of an intended insulating coating.

We also control the tension with films on both surfaces, one surface to which strain will be introduced (a strain-introduced surface) and the other surface to which strain will not be introduced (a non-strain-introduced surface), within a predetermined range, when forming a forsterite film during the above-described final annealing and when forming a tension-applying insulating coating subsequently; and then subjecting the steel sheet to magnetic domain refining treatment of thermal strain type from the side of the strain-introduced surface (on which the steel sheet is convexed), where the degree of magnetic domain refinement (irradiation intensity of electron beam, laser and so on) is adjusted so that the amount of warpage falls within a predetermined range.

EXAMPLES

Example 1

Cold-rolled sheets containing 3 mass % of Si, each of which had been rolled to a final sheet thickness of 0.23 mm, were subjected to decarburization/primary recrystallization annealing. Then, an annealing separator composed mainly of MgO was applied to each sheet. Subsequently, each sheet was subjected to final annealing including a secondary recrystallization process and a purification process, whereby a grain oriented electrical steel sheet having a forsterite film was obtained.

Then, a coating solution composed of 50% colloidal silica and magnesium phosphate was applied to each steel sheet, which in turn was baked at 850° C. to form a tension-applying insulating coating. In this case, the coating amount of the insulating coating was changed on only one surface of each steel sheet so that different tensions were applied to both surfaces of the steel sheet by the insulating coating.

Then, magnetic domain refining treatment was performed on one surface of the steel sheet, where the surface was irradiated with an electron beam in a direction perpendicular to the rolling direction. One surface of each steel sheet was irradiated with an electron beam under conditions of acceleration voltage: 100 kV, irradiation interval: 10 mm and beam current of 3 mA.

The results of measuring the value of (tension applied to non-strain-introduced surface)/(tension applied to strain-introduced surface) and the amount of warpage of the steel sheet toward the strain-introduced surface before electron beam irradiation are shown in Table 1, along with the results of measuring the magnetic flux density $B_8$ and iron loss $W_{17/50}$ after electron beam irradiation.

TABLE 1

| No. | (Tension Applied to Non-strain-introduced Surface)/(Tension Applied to Strain-introduced Surface) | Amount of Warpage of Steel Sheet toward Strain-introduced Surface (mm) | Magnetic Flux Density $B_8$ (T) | Iron Loss $W_{17/50}$ (W/kg) | Remarks |
|---|---|---|---|---|---|
| 1 | 0.76 | 13.1 | 1.95 | 0.81 | Comparative Example |
| 2 | 1.04 | 10.6 | 1.94 | 0.78 | Comparative Example |
| 3 | 1.14 | 9.2 | 1.95 | 0.73 | Example |
| 4 | 1.24 | 8.1 | 1.96 | 0.69 | Example |
| 5 | 1.35 | 6.4 | 1.95 | 0.67 | Example |
| 6 | 1.49 | 4.7 | 1.96 | 0.64 | Example |
| 7 | 1.56 | 3.3 | 1.95 | 0.65 | Example |
| 8 | 1.72 | 2.9 | 1.96 | 0.71 | Example |
| 9 | 1.83 | 1.6 | 1.96 | 0.73 | Example |
| 10 | 1.89 | 0.1 | 1.95 | 0.76 | Comparative Example |
| 11 | 1.94 | −1.1 | 1.96 | 0.78 | Comparative Example |
| 12 | 2.18 | −2.6 | 1.96 | 0.80 | Comparative Example |
| 13 | 2.33 | −4.4 | 1.96 | 0.82 | Comparative Example |

As shown in the table, the iron loss $W_{17/50}$ after electron beam irradiation could be reduced to 0.75 W/kg or less when the value of (tension applied to non-strain-introduced surface)/(tension applied to strain-introduced surface) is 1.0 or more and 2.0 or less before electron beam irradiation and the amount of warpage of the steel sheet toward the strain-introduced surface side is 1 mm or more and 10 mm or less. In particular, the iron loss $W_{17/50}$ after electron beam irradiation could be reduced to 0.70 W/kg or less when the value of (tension applied to non-strain-introduced surface)/(tension applied to strain-introduced surface) is 1.2 or more and 1.6 or less and the amount of warpage of the steel sheet toward the strain-introduced surface side is 3 mm or more and 8 mm or less.

Example 2

Cold-rolled sheets containing 3.2 mass % of Si, each of which had been rolled to a final sheet thickness of 0.23 mm, were subjected to decarburization/primary recrystallization annealing. Then, an annealing separator composed mainly of MgO was applied to each sheet. Subsequently, each sheet was subjected to final annealing including a secondary recrystallization process and a purification process, whereby a grain oriented electrical steel sheet having a forsterite film was obtained.

Then, a coating solution composed of 60% colloidal silica and aluminum phosphate was applied to each sheet, which in turn was baked at 800° C. to form a tension-applying insulating coating. In this case, the coating amount of the insulating coating was changed on only one surface of each steel sheet so that different tensions were applied to both surfaces of the steel sheet by the insulating coating.

Then, magnetic domain refining treatment was performed on one surface of the steel sheet, where the surface was irradiated with a continuous laser in a direction perpendicular to the rolling direction. One surface of each steel sheet was irradiated continuously with a laser under conditions of beam diameter: 0.3 mm, output: 200 W, scanning rate: 100 m/s and interval in the rolling direction: 5 mm.

The results of measuring the value of (tension applied to non-strain-introduced surface)/(tension applied to strain-introduced surface) and the amount of warpage of the steel sheet toward the strain-introduced surface before laser irradiation are shown in Table 2, along with the results of measuring the magnetic flux density $B_8$ and iron loss $W_{17/50}$ after laser irradiation.

TABLE 2

| No. | (Tension Applied to Non-strain-introduced Surface)/(Tension Applied to Strain-introduced Surface) | Amount of Warpage of Steel Sheet toward Strain-introduced Surface (mm) | Magnetic Flux Density $B_8$ (T) | Iron Loss $W_{17/50}$ (W/kg) | Remarks |
|---|---|---|---|---|---|
| 1 | 0.69 | 12.6 | 1.95 | 0.81 | Comparative Example |
| 2 | 0.85 | 11.3 | 1.95 | 0.80 | Comparative Example |
| 3 | 1.06 | 9.2 | 1.96 | 0.73 | Example |
| 4 | 1.13 | 8.3 | 1.95 | 0.71 | Example |
| 5 | 1.26 | 7.9 | 1.96 | 0.70 | Example |
| 6 | 1.41 | 5.4 | 1.95 | 0.69 | Example |
| 7 | 1.53 | 4.1 | 1.96 | 0.64 | Example |
| 8 | 1.69 | 2.0 | 1.97 | 0.71 | Example |
| 9 | 1.76 | 2.4 | 1.96 | 0.73 | Example |
| 10 | 1.93 | −0.8 | 1.96 | 0.77 | Comparative Example |
| 11 | 2.21 | −3.1 | 1.96 | 0.79 | Comparative Example |
| 12 | 2.29 | −3.9 | 1.96 | 0.80 | Comparative Example |

As shown in the table, the iron loss $W_{17/50}$ after laser irradiation could be reduced to 0.75 W/kg or less when the value of (tension applied to non-strain-introduced surface)/(tension applied to strain-introduced surface) is 1.0 or more and 2.0 or less before laser irradiation and the amount of warpage of the steel sheet toward the strain-introduced surface side is 1 mm or more and 10 mm or less. In particular, the iron loss $W_{17/50}$ after laser irradiation could be reduced to 0.70 W/kg or less when the value of (tension applied to non-strain-introduced surface)/(tension applied to strain-introduced surface) is 1.2 or more and 1.6 or less and the amount of warpage of the steel sheet toward the strain-introduced surface side is 3 mm or more and 8 mm or less.

Example 3

Cold-rolled sheets containing 3.6 mass % of Si, each of which had been rolled to a final sheet thickness of 0.27 mm, were subjected to decarburization/primary recrystallization annealing. Then, an annealing separator composed mainly of MgO was applied to each sheet. Subsequently, each sheet was subjected to final annealing including a secondary recrystallization process and a purification process, whereby a grain oriented electrical steel sheet having a forsterite film was obtained. In this case, the coating amount of the annealing separator was changed on only one surface of each steel sheet so that different tensions were applied to both surfaces of the steel sheet by the forsterite film.

Then, a coating solution composed of 50% colloidal silica and magnesium phosphate was applied to each steel sheet, which in turn was baked at 850° C. to form a tension-applying insulating coating.

Then, magnetic domain refining treatment was performed on one surface of the steel sheet, where the surface was irradiated with an electron beam in a direction perpendicular to the rolling direction. One surface of each steel sheet was irradiated with an electron beam under conditions of acceleration voltage: 80 kV, irradiation interval: 8 mm and beam current of 7 mA.

The results of measuring the value of (tension applied to non-strain-introduced surface)/(tension applied to strain-introduced surface) and the amount of warpage of the steel sheet toward the strain-introduced surface before electron beam irradiation are shown in Table 3, along with the results of measuring the magnetic flux density $B_8$ and iron loss $W_{17/50}$ after electron beam irradiation.

TABLE 3

| No. | (Tension Applied to Non-strain-introduced Surface)/(Tension Applied to Strain-introduced Surface) | Amount of Warpage of Steel Sheet toward Strain-introduced Surface (mm) | Magnetic Flux Density $B_8$ (T) | Iron Loss $W_{17/50}$ (W/kg) | Remarks |
|---|---|---|---|---|---|
| 1 | <u>0.48</u> | 13.8 | 1.95 | 0.84 | Comparative Example |
| 2 | <u>0.67</u> | 11.8 | 1.95 | 0.82 | Comparative Example |
| 3 | 1.07 | 9.1 | 1.96 | 0.79 | Example |
| 4 | 1.14 | 8.4 | 1.95 | 0.77 | Example |
| 5 | 1.26 | 5.3 | 1.96 | 0.72 | Example |
| 6 | 1.39 | 4.3 | 1.95 | 0.70 | Example |
| 7 | 1.55 | 3.9 | 1.96 | 0.73 | Example |
| 8 | 1.67 | 2.6 | 1.97 | 0.76 | Example |
| 9 | 1.80 | 1.9 | 1.96 | 0.78 | Example |
| 10 | 1.88 | 1.1 | 1.96 | 0.79 | Example |
| 11 | <u>2.18</u> | −3.7 | 1.96 | 0.83 | Comparative Example |
| 12 | <u>2.66</u> | −5.4 | 1.96 | 0.87 | Comparative Example |

As shown in the table, the iron loss $W_{17/50}$ after electron beam irradiation could be reduced to 0.80 W/kg or less when the value of (tension applied to non-strain-introduced surface)/(tension applied to strain-introduced surface) is 1.0 or more and 2.0 or less before electron beam irradiation and the amount of warpage of the steel sheet toward the strain-introduced surface side is 1 mm or more and 10 mm or less. In particular, the iron loss $W_{17/50}$ after electron beam irradiation could be reduced to 0.75 W/kg or less when the value of (tension applied to non-strain-introduced surface)/(tension applied to strain-introduced surface) is 1.2 or more and 1.6 or less and the amount of warpage of the steel sheet toward the strain-introduced surface side is 3 mm or more and 8 mm or less.

Example 4

Cold-rolled sheets containing 3.3 mass % of Si, each of which had been rolled to a final sheet thickness of 0.20 mm, were subjected to decarburization/primary recrystallization annealing. Then, an annealing separator composed mainly of MgO was applied to each sheet. Subsequently, each sheet was subjected to final annealing including a secondary recrystallization process and a purification process, whereby a grain oriented electrical steel sheet having a forsterite film was obtained. In this case, the coating amount of the annealing separator was changed on only one surface of each steel sheet so that different tensions were applied to both surfaces of the steel sheet by the forsterite film.

Then, a coating solution composed of 50% colloidal silica and magnesium phosphate was applied to each steel sheet, which in turn was baked at 850° C. to form a tension-applying insulating coating.

Then, magnetic domain refining treatment was performed on one surface of the steel sheet, where the surface was irradiated with a continuous laser in a direction perpendicular to the rolling direction. One surface of each steel sheet was irradiated continuously with a laser under conditions of beam diameter: 0.1 mm, output: 150 W, scanning rate: 100 m/s and interval in the rolling direction: 5 mm.

The results of measuring the value of (tension applied to non-strain-introduced surface)/(tension applied to strain-introduced surface) and the amount of warpage of the steel sheet toward the strain-introduced surface before laser irradiation are shown in Table 4, along with the results of measuring the magnetic flux density $B_8$ and iron loss $W_{17/50}$ after laser irradiation.

TABLE 4

| No. | (Tension Applied to Non-strain-introduced Surface)/(Tension applied to Strain-introduced Surface) | Amount of Warpage of Steel Sheet toward Strain-introduced Surface (mm) | Magnetic Flux Density $B_8$ (T) | Iron Loss $W_{17/50}$ (W/kg) | Remarks |
|---|---|---|---|---|---|
| 1 | 0.79 | 11.9 | 1.94 | 0.72 | Comparative Example |
| 2 | 0.88 | 10.4 | 1.94 | 0.68 | Comparative Example |
| 3 | 1.04 | 9.3 | 1.94 | 0.64 | Example |
| 4 | 1.17 | 8.8 | 1.95 | 0.62 | Example |
| 5 | 1.28 | 7.2 | 1.94 | 0.59 | Example |
| 6 | 1.31 | 5.8 | 1.95 | 0.58 | Example |
| 7 | 1.52 | 3.4 | 1.94 | 0.57 | Example |
| 8 | 1.57 | 3.1 | 1.93 | 0.59 | Example |
| 9 | 1.78 | 1.6 | 1.94 | 0.61 | Example |
| 10 | 1.86 | 1.2 | 1.94 | 0.64 | Example |
| 11 | 2.05 | −2.8 | 1.95 | 0.69 | Comparative Example |
| 12 | 2.09 | −3.1 | 1.95 | 0.70 | Comparative Example |

As shown in the table, the iron loss $W_{17/50}$ after laser irradiation could be reduced to 0.65 W/kg or less when the value of (tension applied to non-strain-introduced surface)/(tension applied to strain-introduced surface) is 1.0 or more and 2.0 or less before laser irradiation and the amount of warpage of the steel sheet toward the strain-introduced surface side is 1 mm or more and 10 mm or less. In particular, the iron loss $W_{17/50}$ after laser irradiation could be reduced to 0.60 W/kg or less when the value of (tension applied to non-strain-introduced surface)/(tension applied to strain-introduced surface) is 1.2 or more and 1.6 or less and the amount of warpage of the steel sheet toward the strain-introduced surface side is 3 mm or more and 8 mm or less.

The invention claimed is:

1. A grain oriented electrical steel sheet comprising a steel sheet, a tension-applying insulating coating on both surfaces of the steel sheet and a magnetic domain structure modified by strain introduced to one surface of the steel sheet, wherein 1) tension applied to both surfaces of the steel sheet by the tension-applying insulating coating before strain-introducing treatment satisfies Formula (1), and an amount of warpage of the steel sheet toward a strain-introduced surface side after strain-introducing treatment is 1 mm or more and 10 mm or less:

1.06≤(tension applied to non-strain-introduced surface)/(tension applied to strain-introduced surface)≤2.0 (1), and 2) the amount of warpage of the steel sheet indicates an amount of displacement at a free end of a sample having a length of 280 mm in a rolling direction when placed so that a transverse direction perpendicular to the rolling direction is vertical, clamped and fixed at another end opposite a free end over a length of 30 mm in the rolling direction.

2. The grain oriented electrical steel sheet according to claim 1, wherein 1) the tension applied to both surfaces of the steel sheet by the tension-applying insulating coating before strain-introducing treatment satisfies Formula (2) and the amount of warpage of the steel sheet toward a strain-introduced surface side after strain-introducing treatment is 3 mm or more and 8 mm or less:

1.2≤(tension applied to non-strain-introduced surface)/(tension applied to strain-introduced surface)≤1.6 (2), and 2) the amount of warpage of the steel sheet indicates the amount of displacement at a free end of a sample having a length of 280 mm in a rolling direction when placed so that a transverse direction perpendicular to the rolling direction is vertical, clamped and fixed at another end opposite to the free end over a length of 30 mm in the rolling direction.

3. A grain oriented electrical steel sheet comprising a steel sheet, a tension-applying base film on both surfaces of the steel sheet and a magnetic domain structure modified by strain being introduced to one surface of the steel sheet, wherein 1) tension applied to both surfaces of the steel sheet by the tension-applying base film before strain-introducing treatment satisfies Formula (3), and an amount of warpage of the steel sheet toward a strain-introduced surface side after strain-introducing treatment is 1 mm or more and 10 mm or less:

1.04≤(tension applied to non-strain-introduced surface)/(tension applied to strain-introduced surface)≤2.0 (3), and 2) the amount of warpage of the steel sheet indicates an amount of displacement at a free end of a sample having a length of 280 mm in a rolling direction when placed so that a transverse direction perpendicular to the rolling direction is vertical, clamped and fixed at another end opposite a free end over a length of 30 mm in the rolling direction.

4. The grain oriented electrical steel sheet according to claim 3, wherein 1) tension applied to both surfaces of the steel sheet by the tension-applying base film before strain-introducing treatment satisfies Formula (4) and the amount of warpage of the steel sheet toward a strain-introduced surface side after strain-introducing treatment is 3 mm or more and 8 mm or less:

1.2≤(tension applied to non-strain-introduced surface)/(tension applied to strain-introduced surface)≤1.6 (4), and 2) the amount of warpage of the steel sheet indicates the amount of displacement at a free end of a sample having a length of 280 mm in a rolling direction when placed so that a transverse direction perpendicular to the rolling direction is vertical, clamped and fixed at another end opposite to the free end over a length of 30 mm in the rolling direction.

5. The grain oriented electrical steel sheet according to claim 1, wherein the strain-introducing treatment is electron beam irradiation.

6. The grain oriented electrical steel sheet according to claim 1, wherein the strain-introducing treatment is continuous laser irradiation.

7. The grain oriented electrical steel sheet according to claim 2, wherein the strain-introducing treatment is electron beam irradiation.

8. The grain oriented electrical steel sheet according to claim 3, wherein the strain-introducing treatment is electron beam irradiation.

9. The grain oriented electrical steel sheet according to claim 4, wherein the strain-introducing treatment is electron beam irradiation.

10. The grain oriented electrical steel sheet according to claim 2, wherein the strain-introducing treatment is continuous laser irradiation.

11. The grain oriented electrical steel sheet according to claim 3, wherein the strain-introducing treatment is continuous laser irradiation.

12. The grain oriented electrical steel sheet according to claim 4, wherein the strain-introducing treatment is continuous laser irradiation.

* * * * *